Aug. 13, 1963    W. J. TOPAZIO ET AL    3,100,858
PRESSURE REBALANING AND MEASURING SERVOSYSTEM
Filed Aug. 12, 1960    2 Sheets-Sheet 1

INVENTORS
WILLIAM J. TOPAZIO
JOHN D. WEIR
BY
ATTORNEY

Aug. 13, 1963  W. J. TOPAZIO ET AL  3,100,858
PRESSURE REBALANING AND MEASURING SERVOSYSTEM
Filed Aug. 12, 1960  2 Sheets-Sheet 2

INVENTORS
WILLIAM J. TOPAZIO
JOHN D. WEIR
BY
ATTORNEY

United States Patent Office 3,100,858
Patented Aug. 13, 1963

3,100,858
PRESSURE REBALANCING AND MEASURING SERVOSYSTEM
William J. Topazio, Levittown, and John D. Weir, Huntington, N.Y., assignors to Sperry Rand Corporation, Great Neck, N.Y., a corporation of Delaware
Filed Aug. 12, 1960, Ser. No. 49,365
11 Claims. (Cl. 318—28)

This invention relates generally to aircraft instruments and more particularly to instruments which respond to changes in pressure.

A pressure responsive device of the type in which the present invention may be employed is disclosed in U.S. Patent 2,729,780, issued in the name of H. Miller et al. and assigned to the assignee of the present invention. In the structure disclosed in that patent, a balancing beam which is rigidly connected to the center of a torsion bar twists the bar about its axis when a force is applied to the beam. The force applied to the beam is derived from a bellows which responds to pressure changes and which is connected to the beam by a rigid link maintained under tension. Generally, the link is maintained under tension by keeping the pressure on the outside of the bellows always greater than the pressure within the bellows. As the beam starts to move in response to the force applied from the bellows, it moves the armature of an E pick-off substantially parallel to, but in spacial alignment with, the stationary member of the pick-off. This produces a pick-off output signal which operates a motor that rotates the twisted torsion bar until the pick-off signal is cancelled. The amount the torsion bar is rotated is proportional to the pressure change experienced by the bellows.

Because the balancing beam is rigidly connected to the bellows and the torsion bar (which is restricted to rotational movement about its axis only), the bellows must bend whenever a pressure change causes it to expand or contract. Repeated bending of the bellows adversely affects its characteristics, thereby causing a decrease in the accuracy of the device. Furthermore, since pressure changes must first overcome the stiffness of the bellows to bending forces before the torsion bar may be twisted, the device is insensitive to small pressure changes which are unable to bend the bellows. In practice, the torsion bar of this device is twisted only when a pressure change equivalent to an altitude change of at least 20 feet has been experienced.

The present invention proposes, among other things, the replacement of the aforementioned rigid link which connects the bellows to the torsion bar with a link which is stiffer to tensile forces, but much more resilient to bending forces, than the bellows itself. With such a link, the force of the expanding or contracting bellows may still be applied to twist the torsion bar but, because the link is more flexible to bending forces than the bellows, only the link will bend as the bar is twisted. This assures that the accuracy of the device will not deteriorate, since the bellows can never become contorted. Furthermore, the sensitivity of the device is determined primarily by the stiffness of the link to bending forces (and not by the stiffness of the bellows to bending forces) because this is the only stiffness which must be overcome in twisting the torsion bar. Since this stiffness can be decreased to substantially zero, the sensitivity of the device can be made very high. In practice, the torsion bar of a device employing a wire or flat spring link is twisted when a pressure change equivalent to an altitude change of a mere six inches has been experienced.

Aside from an improved link between the bellows and the torsion bar, the present invention provides an improved torsion bar suspension system which eliminates the need for the earlier mentioned beam and, at the same time, permits the E pick-off armature to be rotated (about an axis parallel to the torsion bar) so that it angularly moves relative to the E pick-off stationary member when the bellows expands or contracts. Elimination of the beam is desired not only for weight and space saving purposes, but because the beam is sensitive to vibrations and, as such, causes the torsion bar to vibrate at its natural frequency when so excited. The beam configurations of this type have low natural frequencies which are easily excited. The beam, further, is highly sensitive to accelerations (both angular and linear) which requires extreme balancing accuracy to correct. Angular movement of the E pick-off armature relative to the stationary member is preferred over armature movement which is parallel to the stationary member because a given E pick-off output signal can be obtained, using the angular movement arrangement, that is equivalent to the parallel movement arrangement employing a multiplying lever of 8 or 10 to 1.

Generally, apparatus embodying the improved torsion bar suspension system has the torsion bar rigidly secured to the center of the pick-off armature and thereby rotates the armature whenever the bar is twisted. The bellows is connected to one end of the armature by means of a link of the type described earlier. As the bellows expands or contracts, it applies a torque about the axis of the torsion bar by applying a force on one side of the armature. A link, which is likewise resilient to bending forces but stiff to tensile forces, is connected between the bar and the housing of the device and prevents the bar from bending when the bellows exerts a force on the armature.

Within the scope of this feature of the invention, it is recognized that the torsion bar need not be rigidly secured to the center of the armature as set forth above, but may be secured anywhere between the ends of the armature. However, if the torsion bar does not connect to the armature center, the armature may respond to vibrations and act like the balancing beam of the Miller patent.

A principal object of the invention is to provide an improved pressure measuring device.

Another object is to provide an improved coupling between a bellows and a device rotatable in response to movement of the bellows.

Another object is to provide an improved torsion bar suspension system for use in a pressure responsive device.

The invention will be described with reference to the figures wherein.

Figure 1:
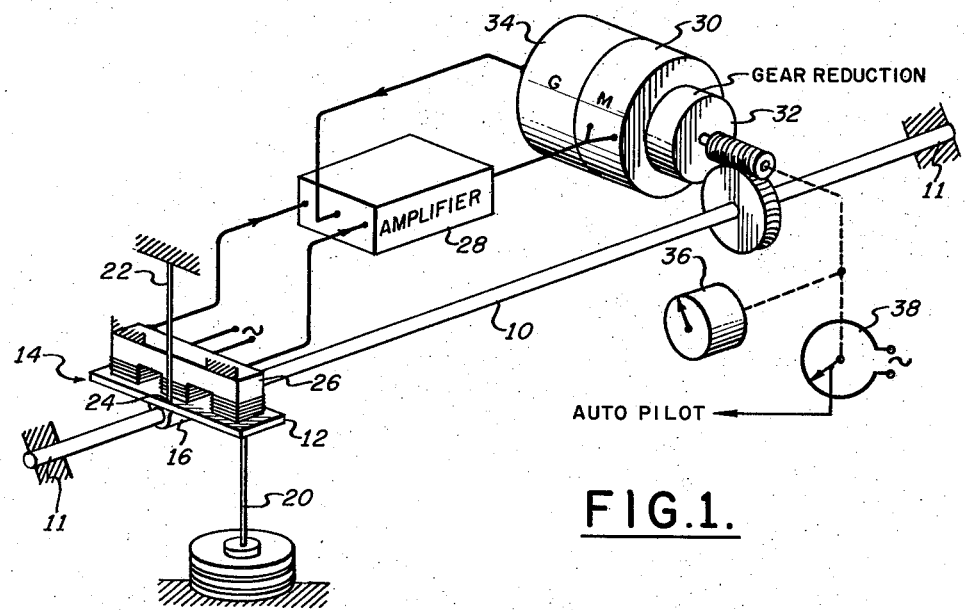
FIG. 1 is a schematic diagram of apparatus embodying the invention.
Figure 2A:
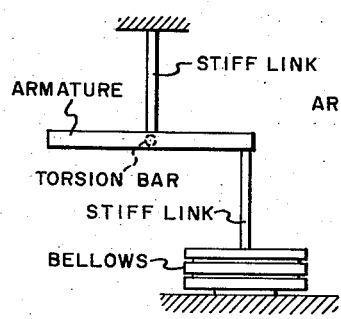
FIGS. 2a and 2b are diagrams useful in explaining a feature of the invention.
Figure 2B:
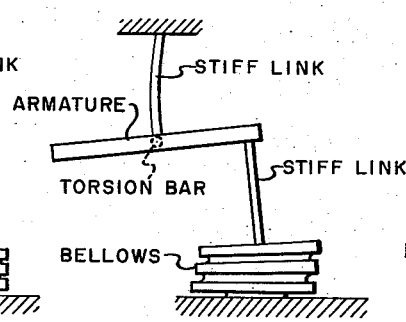

Referring to FIG. 1, a torsion bar 10 which is supported in journal bearings 11 has the armature 12 of an E pick-off 14 fixedly connected to it at 16. A pressure responsive element, such as a bellows 18, is connected to one end of the armature 12 by means of a link 20, e.g. a wire, which is stiff to tensile forces, but resilient to bending forces. The link 20 is always maintained under tension by keeping the pressure within the bellows 18 less than the pressure on the outside of the bellows. In the event the device is used as an absolute pressure measuring instrument, e.g. an altimeter, the link 20 is maintained under tension by evacuating the bellows; this is the case as set forth in FIG. 1. When, however, the device is used as a pressure differential measuring device, e.g. an air speed measuring instrument, the bellows' interior is exposed to static pressure whereas the exterior of the bellows is exposed to impact, or pitot, pressure. Maintaining the link 20 under tension is necessary to prevent the link from buckling, i.e. assuming a bow-like form when the bellows 18 expands. A link 22, preferably similar to the link 20, is connected to the armature 12 at a pivot point 24 which lies in a plane which is orthogonal to the axis of the torsion bar 10 and in which the link 20 is free to bend. It is preferred that the link 22 be similar to the link 20 because, as the armature 12 is rotated by the force derived from the bellows 18, a bending force (which tends to bend the link 22 in the aforementioned plane) will be applied to the link 22; if the link 22 is stiff to bending forces, the bellows will have to overcome this stiffness in order to twist the torsion bar 10, thereby decreasing the sensitivity of the device as earlier described. See FIGS. 2a and 2b which show, for instructive purposes, the effects of using stiff links in place of flexible links (the bellows here however having internal pressure so that it can push and pull the lower link depending on ambient pressure). The output signal, if any, from the stationary member 26 of the pick-off 14 is applied to an amplifier 28. The amplifier 28 then applies its output signal to a motor 30 which rotatably drives, through gearing 32, the torsion bar 10 and the armature 12 to cancel the pick-off 14 output signal. A tachometer generator 34 which is driven by the motor 30 feeds back, in accordance with established servo practice, a rate signal to the amplifier 28 to damp the operation of the motor 30. Shown being driven by the motor is an altitude indicating instrument 36 and a potentiometer 38 which may be used to provide the craft autopilot with a signal representing altitude. Synchros or other output devices can be driven by the motor also.

When the apparatus of FIG. 1 is initially set up and calibrated, the tension in the link 20 is set so that the armature 12 will be rotated (against the torsional force of the bar 10 which is anchored at one end in gearing 32) relative to the pick-off stationary member 26 just enough to produce a pick-off output signal which will drive the indicator 36 to read the altitude at which the device is calibrated and rotate the bar 10 to cancel the pick-off output signal. With the device installed in an aircraft, an increase in altitude will cause the bellows 18 to expand, thereby reducing the tension in the link 20. This causes the effect of the torsional force of the bar 10 on the armature 12 to be greater than the effect of the tensile force of the link 20 and, as a result, the torsion bar will untwist to balance the two force effects. This causes the armature 12 to assume an angular relationship with the pick-off stationary member 26, thereby producing a pick-off 14 output signal (as earlier described) which operates to rotate the torsion bar to cancel the signal and, at the same time, drive the indicator 36 to read the higher altitude. A decrease in altitude will increase the tension in the link 20, the effects of which were described in reference to the setting up and calibration of the device.

Figure 3:
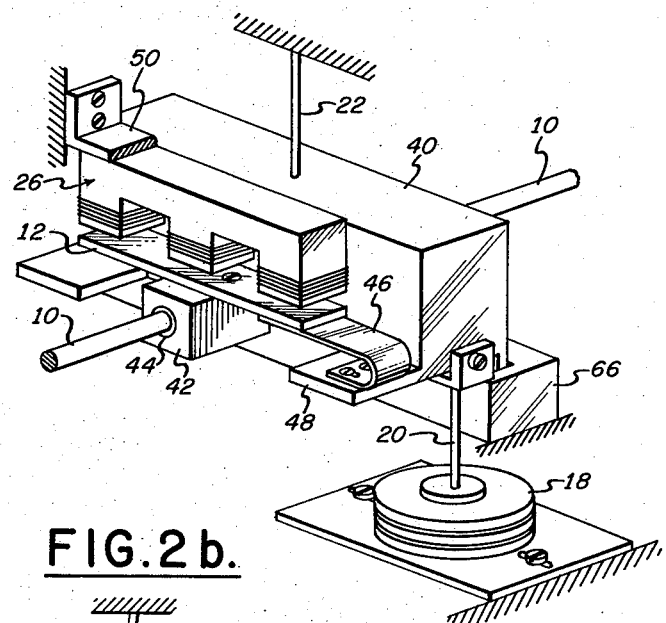
FIG. 3 is a perspective, partially cutaway view of a presently preferred E pick-off armature holder useable by apparatus embodying the invention.
Figure 4:
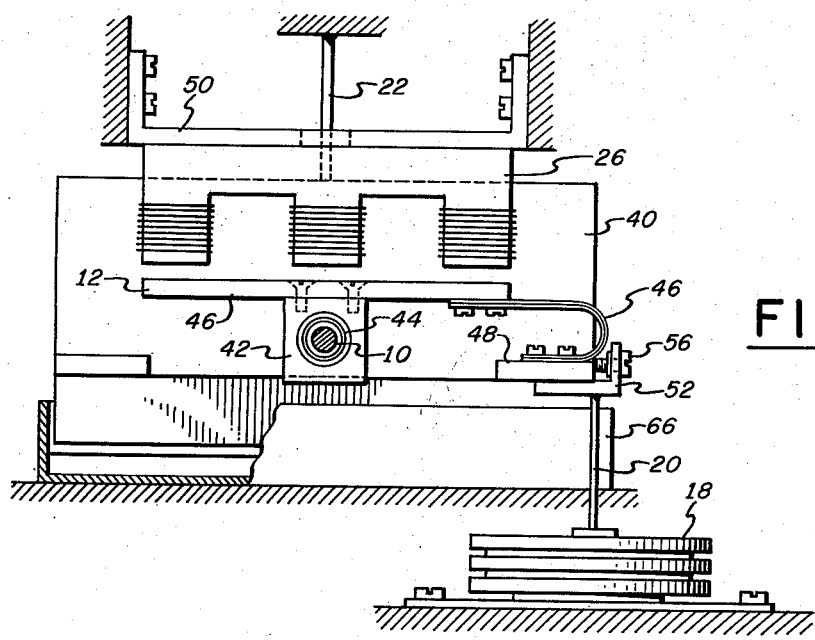
FIG. 4 is a front view of the apparatus of FIG. 3.
Figure 5:
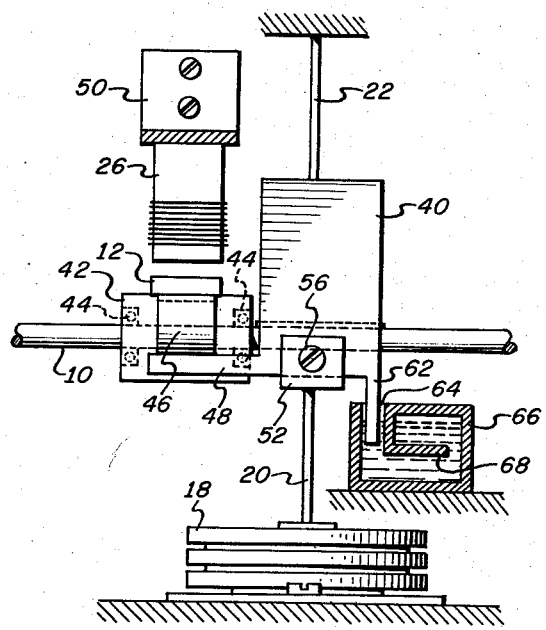
FIG. 5 is an end view of the apparatus of FIG. 3.

Referring to FIGS. 3, 4 and 5, the presently preferred armature support is provided with a base member 40 which is fixedly connected to the torsion bar 10. The support is further provided with a movable member 42 which is rotatably mounted in bearings 44 on the bar 10. A bimetallic strip 46 is rigidly connected to a leg 48 extending from the base member 40 and to the E pick-off armature 12. The armature 12 in turn is rigidly connected to the movable member 42. Fixedly supported above the armature by means of a bracket 50 is the stationary member 26 of the pick-off. Cooperation among the elements 40, 42, 44, 46 and 48 provides compensation for temperature variations which vary the characteristics of the different components within the device. This will be explained in detail later.

A positionable member 52 having a threaded hole is connected to the base member 40 by means of a screw 56. The link 20 which connects to the bellows 18 is then connected to the positionable member 52. Thus, the point at which force is applied to the armature support is variable. Variability of the point of application of force to the support is necessary to compensate, during calibration, for any mismatching between the characteristics of the bellows 18 and the torsion bar 10. The bellows 18 likewise is positionable so that, when the member 52 is repositioned, it too may be positioned and thereby keep any force developed by the bellows acting at a right angle to the base member 40.

A flange 62 extends from the base member 40 into a slot 64 in a damping fluid container 66. The supporting structure for the container is not shown. The slot 64 must be such that capillary action of the damping fluid, will prevent the fluid from flowing out. Within the container 66, and extending from a side of the slot 64, is an L-shaped wall 68 which serves as an oil reservoir and prevents all of the damping fluid from seeping out through the slot when the device is turned upside down or on its side for an extended time period. Whatever fluid is lost, however, may be replaced through a port (not shown) in the container 66.

When the pressure sensor elements experience varying temperatures, the effect is to rotate the base member 40 about the axis of the torsion bar in proportion to these temperature changes. This is caused by the dimensional and modulus changes of the various parts. This rotation of member 40 as a function of temperature would produce, therefore, an angular displacement between the pick-off armature 12 and the stationary member 26, which would, as earlier explained, cause the motor 30 to run (to cancel that displacement) and drive the indicator 36 to a wrong indication of pressure. The bimetallic strip 46 displaces the armature 12 (which is restricted to only rotation about the torsion bar axis because it is secured to the movable member 42) about that same axis in the direction to correct for the temperature change. Thus, regardless of temperature changes, the angular relationship between the armature 12 and the pick-off stationary member 26 is held constant.

Adjustment slots are provided in the bimetal strip so that the displacement as a function of temperature can be calibrated by changing the length of exposed bimetal material.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pressure responsive device comprising a bar rotatable about its own longitudinal axis, means movable in response to pressure variations, tensilely stiff and bendably resilient connecting means fixedly connected to said rotatable bar and to said movable means to rotate said rotatable bar in proportion to said pressure variations, and means for maintaining said connecting means under tension.

2. A pressure responsive device comprising means rotatable about an axis, means positionable in response to changes in pressure, means under tension fixedly connected to said positionable and rotatable means to rotate said rotatable means in proportion to pressure changes, said means under tension being stiff to tensile forces and flexible to bending forces, means responsive to produce a signal proportional to the amount said rotatable means rotates, and means receiving said signal operable to rotate said rotatable means an amount substantially equal to, but opposite, the rotation produced by said tension means.

3. A pressure transducer comprising a torsion bar, means movable in response to pressure changes, means maintained under tension connecting said movable means to said torsion bar and applying a torque about the longitudinal axis of said bar, said means under tension being stiff to forces along its longitudinal axis and resilient to bending forces, and means responsive to the torsion of said bar to apply a torque to said torsion bar to cancel substantially the torque applied by said movable means.

4. A pressure responsive device comprising movable means, a barometric device responsive to pressure variations to move said movable means, a torsion bar, means under tension connecting said movable means to said torsion bar and applying a torque about said torsion bar longitudinal axis, said means being flexible to forces perpendicular to its longiutdinal axis and stiff to forces along its longitudinal axis, and means responsive when a torque is applied to said bar by said tension means to cancel substantially that torque by twisting said bar.

5. Pressure responsive apparatus comprising a bellows, a torsion bar, means under tension connecting said torsion bar to said bellows and applying a torque about the longitudinal axis of said bar, said means under tension being stiff to tensile forces and substantially more flexible to bending forces than said bellows, and means responsive when a torque is applied to said bar by said means under tension to cancel substantially that torque by twisting said bar.

6. Pressure responsive apparatus comprising a torsion bar, pick-off means having a stationary and a movable member, said movable member being connected to said torsion bar, means movable in response to pressure variations, means maintained under tension connecting said pick-off means movable member to said means movable in response to pressure variations applying a torque about the longitudinal axis of said torsion bar, said means maintained under tension being stiff to longitudinal forces and resilient to forces tending to bend it, said stationary member producing a signal when said movable member moves relative to it, and means receiving said signal operating to twist said torsion bar in proportion to said signal and thereby maintain the relative positions of said stationary and movable members substantially constant.

7. The structure of claim 6 wherein said means maintained under tension is a wire.

8. Pressure responsive apparatus comprising a torsion bar, pick-off means having a stationary and a movable member, said movable member being connected to said torsion bar, means movable in response to pressure variations, means maintained under tension connecting said pick-off means movable member to said means movable in response to pressure variations applying a torque about the longitudinal axis of said torsion bar, said means maintained under tension being stiff to longitudinal forces and resilient to forces tending to bend it, said stationary member producing a signal when said movable member moves relative to it, means receiving said signal operating to twist said torsion bar in proportion to said signal and thereby maintain the relative positions of said stationary and movable members substantially constant, containing means having an opening therein, means extending partway into said containing means from one side of said opening, and forming an inverted cup with the sides of said containing means, fluid in said containing means, and means connected to said movable member and extending into said containing means through said opening.

9. A pressure transducer comprising a torsion bar, positionable means connected to said torsion bar, means movable in response to pressure changes, means maintained under tension connecting said movable means to said positionable means and applying a torque about the longitudinal axis of said bar, said means under tension being stiff to forces along its longitudinal axis and resilient to bending forces, and means responsive to the torsion of said bar to apply a torque to said torsion bar to cancel substantially the torque applied by said movable means.

10. Apparatus responsive to variations in pressure comprising a torsion bar, a barometric device movable in response to pressure changes, support means connected to said torsion bar, means rotatable about the longitudinal axis of said torsion bar, pick-off means having a stationary and movable member producing a signal proportional to the angular misalignment between its members, said movable member being connected to said support means and said means rotatable about the longitudinal axis of said torsion bar, means responsive to temperature changes to rotate said rotatable means relative to said support means, means maintained under tension connecting said barometric device to said support means applying a torque about the longitudinal axis of said torsion bar to rotate said pick-off means movable member, said rotatable means, and said support means about said torsion bar longitudinal axis when said barometric device moves, said means under tension being stiff to longitudinal forces and resilient to bending forces, and means responsive to said pick-off means signal operable with said torsion bar to apply a torque to the bar and thereby cancel substantially any angular misalignment between the pick-off means members.

11. Apparatus responsive to variations in pressure comprising a torsion bar, a barometric device movable in response to pressure changes, support means connected to said torsion bar, positionable means connected to said support means, means rotatable about the longitudinal axis of said torsion bar, pick-off means having a stationary and movable member producing a signal proportional to the angular misalignment between its members, said movable member being connected to said support means and said means rotatable about the longitudinal axis of said torsion bar, means responsive to temperature changes to rotate said rotatable means relative to said support means, means maintained under tension connecting said barometric device to said positionable means applying a torque about the longitudinal axis of said torsion bar to rotate said pick-off means movable member, said rotatable means, and said support means about said torsion bar longitudinal axis when said barometric device moves, said means under tension being stiff to longitudinal forces and resilient to bending forces, means responsive to said pick-off means signal operable with said torsion bar to apply a torque to the bar and thereby substantially cancel any angular misalignment between the pick-off means members, containing means having an opening therein, means extending partway into said containing means from one side of said opening and forming an inverted cup with the sides of said containing means, fluid in said containing means, and means connected to said support means extending into said containing means through said opening.

References Cited in the file of this patent
UNITED STATES PATENTS

| | | |
|---|---|---|
| 2,115,086 | Riggs | Apr. 26, 1938 |
| 2,720,620 | Power | Oct. 11, 1955 |
| 2,729,780 | Miller et al. | Jan. 3, 1956 |
| 2,788,665 | Wainko | Apr. 16, 1957 |
| 2,798,191 | Brailsford | July 2, 1957 |
| 2,849,669 | Kinkel | Aug. 26, 1958 |
| 2,980,835 | Williams | Apr. 18, 1961 |